June 2, 1964  S. L. LEWIS  3,135,190
COMMERCIAL COOKING APPARATUS
Filed May 1, 1961  2 Sheets-Sheet 1
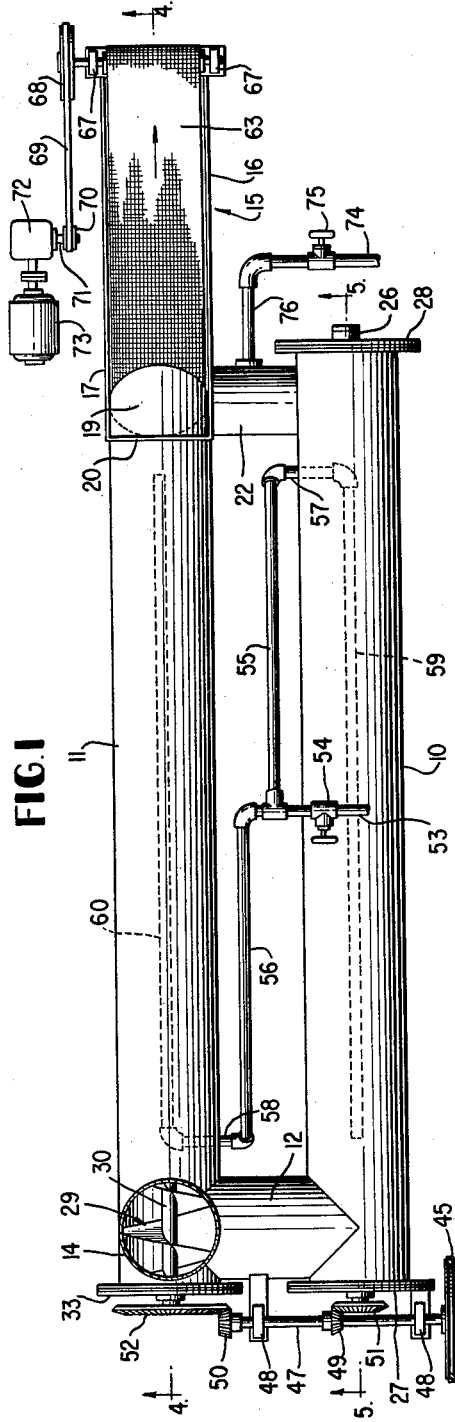
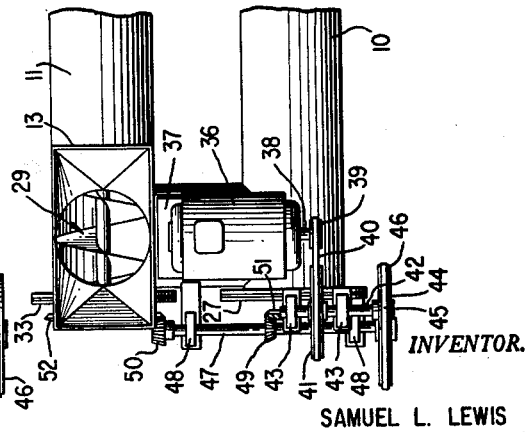
INVENTOR.
SAMUEL L. LEWIS
BY
ATTORNEY

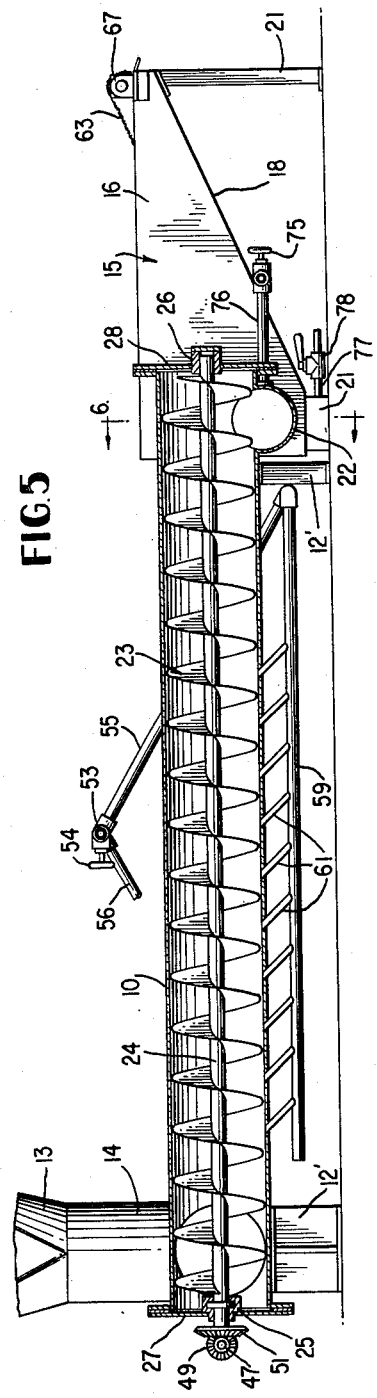

United States Patent Office 3,135,190
Patented June 2, 1964

3,135,190
COMMERCIAL COOKING APPARATUS
Samuel L. Lewis, Brunswick, Ga., assignor to Golden Shore Seafoods, Inc., a corporation of Georgia
Filed May 1, 1961, Ser. No. 106,777
9 Claims. (Cl. 99—443)

This invention relates to improved apparatus for the commercial cooking of a wide variety of food products such as seafood including shrimp, vegetables, fruit, rice and the like.

A primary object of the invention is to provide a high production commercial cooker for mass quantities of food, designed for the complete elimination of scorching and of sticking of the food to the apparatus, eliminating the need for stirring, and delivering the thoroughly cooked food in a tender, unbruised and unmangled condition at the discharge end of the apparatus.

Another object of the invention is to provide cooking apparatus which utilizes water at or near the boiling point assisted in its passage through the apparatus by a novel arrangement of heating and propelling steam jets.

Another object is to provide apparatus for cooking embodying a companion pair of elongated tubes and rotary helical screw elements within the tubes to regulate or time the passage of the hot water and food products through the apparatus in a controlled cooking cycle.

Another object is to provide cooking apparatus of the mentioned type which is readily adjustable and which may vary in size through wide limits without changing its principle of operation.

Still another object is to provide apparatus of the mentioned type which is ideally suited for blanching fruits and vegetables prior to subsequent frozen food processing operations.

Another object is to provide commercial cooking apparatus which is highly economical to operate, substantially self-cleaning, fully automatic, easy to maintain and inexpensive to manufacture, in light of the great quantities of cooked food products produced by the apparatus.

Still another object is to provide cooking apparatus for large quantities of food stuffs, and wherein the food virtually floats through the long cooking tube in hot water, under the controlling influence of the screw element but without mechanical pressure being exerted upon the food by the screw element.

Another object is to provide a cooker into one end of which the raw food products may be deposited in great quantity for delivery in a completely and uniformly cooked state from the other end of the cooker automatically and ready for further processing or handling.

Other objects and advantages of the invention will become apparent during the course of the following description.

In the drawings, forming a part of this application and in which like numerals are employed to designate like parts throughout the same, FIGURE 1 is a plan view of apparatus for cooking according to the invention, partly in section, FIGURE 2 is a fragmentary plan view of the food intake end of the apparatus, FIGURE 3 is an end elevation of the apparatus viewed from the food intake end, FIGURE 4 is a longitudinal vertical section taken on line 4—4 of FIGURE 1, with parts omitted and parts broken away, FIGURE 5 is a similar section taken on line 5—5 of FIGURE 1, FIGURE 6 is a transverse vertical section taken on line 6—6 of FIGURE 5, with parts omitted.

In the drawings, wherein for the purpose of illustration is shown a preferred embodiment of the invention, the numeral 10 designates a first or water heating cylindrical tube formed of stainless steel or the like and of a size to fit the needs of a particular commercial operation. For example, the diameter of the tube 10 may vary from about six inches in diameter to two feet or more in diameter, and the length of the tube 10 may vary from about four feet to twenty or more feet as required. While dimensions are not critical in the invention, it is desired to explain that the size and capacity of the apparatus may vary through a considerable range.

A companion or second food cooking tube 11 is disposed in laterally spaced parallel relation to the tube 10 and approximately coextensive therewith lengthwise and having the same diameter as the tube 10 and formed of the same material such as stainless steel. Both of the tubes 10 and 11 are disposed horizontally in use and are supported at a slight elevation above the floor by a suitable framework 12' which need not be described in detail.

The tubes 10 and 11 are connected in communication at corresponding ends by a short transverse horizontal branch tube section 12, preferably of the same diameter as the tubes 10 and 11 and secured thereto suitably in a fluid tight manner. As will later appear, hot water may circulate from the tube 10 into the branch tube section 12 and from this tube section into the tube 11.

An upstanding funnel-like food hopper 13 is carried by the food cooking tube 11 at its end adjacent the branch tube section 12 and having a lower vertical cylindrical throat section 14 suitably secured to the tube 11 and communicating directly with the interior thereof. As will be apparent, the food to be cooked is introduced directly into the hopper 13 and from this hopper the food gravitates into the cooking tube 11.

The opposite or discharge end of the cooking tube 11 opens into a food collection and discharge tank 15 which is rectangular in cross section, FIGURE 6, with upstanding side walls 16 and 17, an open top and an inclined bottom wall 18 which extends somewhat below the elevation of the bottoms of the tubes 10 and 11, which tubes are at the same elevation. The discharge end portion 19 of cooking tube 11 is connected within an opening in the rear vertical wall 20 of tank 15 in a fluid tight manner. The tube 11 opens into the upper portion of the tank 15 as shown in FIGURES 4 and 6. The tank 15 is supported by suitable framing 21 which need not be described in detail, and the rear wall 20 of the tank aids in the supporting of the cooking tube 11.

A short horizontal transverse water return tube 22 is connected in the tank side wall 16 near the bottom of the tank and substantially below the central axes of the tubes 10 and 11, FIGURES 5 and 6. The return tube 22 communicates directly with the interior of the tank 15 and also connects into the bottom of the water heating tube 10 near its end adjacent the tank 15. The tube section 22 allows the hot water to re-circulate from the cooking tube 11 back into the water heating tube 10 during the continuous operation of the apparatus to be further described.

As should now be apparent, the tubes 10 and 11 and the branch tube sections 12 and 22 constitute a continuous horizontal tube loop or circuit for the hot water utilized in the apparatus as the cooking medium. The tank 15 is also connected in and forms a part of the hot water circuit, as already described. The hot water flows continuously and in a controlled manner through the entire circuit composed of the tubes 10 and 11, 12, 22 and the tank 15, whereas the food to be cooked passes only through the tube 11 from the hopper 13 and toward the tank 15 as will be fully described hereinafter.

A first long helical screw 23 is disposed rotatably within the water heating tube 10 and substantially coextensive lengthwise therewith and having a diameter only slightly less than the inside diameter of the tube 10. The central shaft 24 of the screw 23 has its ends suitably journaled for rotation upon suitable fixed bearings 25 and 26 carried by end fluid tight cover plates 27 and 28 for the tube 10. The cover plates 27 and 28 may be gasketed to render the ends of the tube 10 fluid tight, and the bearings 25 and 26 may be sealed in a conventional manner. As will be further described, the screw 23 regulates the flow of hot water through the tube 10 in a controlled manner from the inlet end adjacent tube section 22 to the outlet defined by tube section 12. The rotary screw 23 agitates or mixes the hot water and propels it longitudinally through the tube from right to left as viewed in FIGURE 5. The screw 23 also prevents the hot water from passing through the tube 10 too rapidly and without adequate heating therein.

A companion or second helical screw 29 is disposed rotatably within the food cooking tube 11 and extends lengthwise thereof and substantially coextensive therewith as shown. The central shaft 30 of the screw 29 has its ends journaled for rotation upon bearings 31 and 32 secured respectively to an end cover plate 33 for the tube 11 and leg support means 34 which rigidly interconnects the bearing 32 to a surrounding ring 35 securely anchored within the tube 11 near the discharge end of the same. The cover plate 33 is gasketed to provide a fluid tight joint with the tube 11 and the bearing 31 is suitably sealed. The bearing 32 is disposed centrally of the open discharge end portion 19 of the tube 11 which communicates with the tank 15, FIGURE 4. As will be fully described, the screw 29 regulates the passage of food and hot water through the cooking tube 11 from the hopper 13 toward the tank 15. The screw 29 does not feed or propel the food and water through the tube 11, but in fact retards and controls its flow therethrough in the desired manner to be further described.

Means are provided to rotate the two screws 23 and 29 continuously, in unison, and in opposite directions, so that the hot water will flow through the tube 10 from right to left, FIGURE 1, and through the tube 11 from left to right as viewed in this same figure. Such means comprises a suitable motor 36, rigidly mounted atop the branch tube 12 upon a support plate 37. The armature shaft 38 of the motor carries a small pulley 39, engaged by a belt 40, driving a larger pulley 41, mounted upon an elevated shaft 42 supported for rotation in fixed bearings 43. Shaft 42 drives another small pulley 44, rigid therewith, engaged by a belt 45, driving a large pulley 46, carried by a transverse horizontal shaft 47, mounted for rotation within fixed bearings 48. Shaft 47 carries small spaced back-to-back bevel gears 49 and 50, having driving engagement with larger bevel gears 51 and 52, secured respectively to end extensions of screw shafts 24 and 30, FIGURES 5 and 4, outwardly of end cover plates 27 and 33. It will be noted that the bevel gear 51 is considerably smaller than the gear 52, see FIGURE 3. This arrangement provides for driving or rotating the screw 23 in the water heating tube 10 considerably faster than the screw 29 in the food cooking tube 11. In practice, the screw 23 may turn from three to five times as fast as the screw 29, although this speed differential may be varied somewhat as found desirable.

A live steam pipe 53, FIGURE 1, leads from a suitable steam source, not shown, and passes above the tube 10 transversely near the longitudinal center thereof. The pipe 53 may be equipped with a manual valve 54 for shutting off the steam supply when desired. Inclined branch steam pipes 55 and 56 lead from the pipe 53 in the space between the tubes 10 and 11, and the pipes 55 and 56 are connected with short horizontal pipe sections 57 and 58 below the tubes 10 and 11 and near and inwardly of opposite ends of the same. Elongated horizontal steam pipes or headers 59 and 60 extend from the pipe sections 57 and 58 and along the bottoms of the tubes 10 and 11 for the major portions of their lengths as shown in the drawings. The headers 59 and 60 are spaced somewhat below the bottoms of the tubes 10 and 11. A multiplicity of upwardly and forwardly inclined steam jet nozzles 61 lead from the top of the header 59 and open through the bottom of the water heating tube 10 for directing live steam jets into this tube at a plurality of points along its length. These angled steam jets from the angled nozzles 61 serve not only to heat the water in the tube 10 to approximately the boiling point, but also aid in propelling the water through the tube 10 lengthwise to the left, FIGURE 5, or from the branch pipe section 22 toward the branch pipe section 12. Correspondingly, angled steam jet nozzles 62 lead from the top of steam header 60 and open through the bottom of the cooking tube 11 to direct jets of steam into the bottom of this tube. These steam jets from the nozzles 62 aid in maintaining the water hot in the cooking tube 11 and also aid in propelling the water and the food product flowing with the water through the tube 11 from left to right, FIGURE 4, or from the hopper 13 toward the tank 15. The nozzles 62 are therefore angled or inclined in the opposite direction to the nozzles 61 as indicated from an inspection of FIGURES 4 and 5.

Within the tank 15 and near and parallel to the inclined bottom wall 18 of the tank is an endless foraminous discharge conveyor belt 63 formed of stainless steel, wire mesh or the like and having its upper run traveling in the direction of the arrows shown in FIGURES 1 and 4. The belt 63 is mounted on rolls 64 and 65, journaled for rotation near the bottom of the tank and slightly above the top thereof, respectively, FIGURE 4. The belt 63 has its longitudinal edges passing close to the vertical side walls 16 and 17 of the tank. The lower end of the belt 63 is positioned directly under the outlet extension 19 of the cooking tube 11 to receive the cooked food products directly therefrom as they are discharged from the tube 11 into the tank 15.

The shafts of the conveyor rolls 64 and 65 are journalled for rotation upon suitable bearings 66 and 66′, FIGURE 6, and 67, FIGURES 1 and 5. The upper conveyor roll 65 is positively driven by a pulley 68, carrying a belt 69, driven by a smaller pulley 70, carried by the output shaft 71 of a speed reducer 72, in turn driven by a suitable motor 73, see FIGURE 1.

A water supply pipe 74 having a manual valve 75 leads from a suitable source, not shown, of preheated or cool water. The pipe 74 has a branch 76 opening directly into the branch pipe section 22 as shown in FIGURES 1 and 5 to supply water to the system as required. The level of the water in the system is maintained by the pipe 74 preferably up to or near the top sides of the screws 23 and 29, so that the two tubes 10 and 11 are substantially filled with hot water at all times, and the tank 15 is also filled to the level at the top of screw 29. It is preferred that the water entering the system through the pipe 74 be preheated at least to some extent, but if this is not the case, the live steam jets from the nozzles 61 and 62 will quickly heat the water to boiling or slightly below boiling.

A drain pipe 77 leads from the bottom of the tank 15 as shown in the drawings, and this drain pipe may have a valve 78 connected therein.

A filter screen 79 may be provided across the opening from the bottom of the tank 15 into the branch tube 22 to completely eliminate the possibility of food particles passing into the pipe section 22. The screen 79 is ordinarily unnecessary and may be omitted in most cases because the longitudinal edges of the belt 63 run close to the side walls of the tank 15 and the food deposited upon the belt 63 from the tube 11 travels immediately upwardly with the top run of the belt and has no tendency to enter the pipe section 22.

Preferably, all major elements of the apparatus are formed of stainless steel or some other suitable non-corrosive metal.

The cooking time cycle of the apparatus may be varied by utilizing helical screws having different pitches. In like manner, the cycle may be varied by changing the diameter of the bevel gear 51 relative to the gear 52 or by other substitutions in the drive gearing.

The general mode of operation of the apparatus is as follows;

The water level in the apparatus is set and maintained at or near the tops of the screws 23 and 29. The two screws are rotated continuously by the motor 36 and associated drive gearing and the conveyer belt 63 is driven continuously under influence of motor 73. As previously explained, the screw 23 in water heating tube 10 rotates considerably faster than the screw 29 in food cooking tube 11. Live steam is introduced into the bottoms of the tubes 10 and 11 through the angled nozzles 61 and 62, as required to maintain the water preferably slightly below the boiling temperature.

The food such as shrimp, peeled potatoes, peaches to be blanched, tomatoes, vegetables, fruit, rice or other seafood is introduced in almost any desired quantity and as rapidly as desired into the hopper 13. The food will gravitate automatically into the back end of the cooking tube 11 which is the left hand end in FIGURES 1 and 4.

Hot water heated to or near the boiling point in the tube 10 will flow continuously under influence of the screw 23 and the angled steam jets 61 from the tube 10 and through the branch tube 12 and into and through the cooking tube 11. In the tube 11, the forward flow of water toward the tank 15 is aided by the angled jet nozzles 62, and the steam from these nozzles maintains the water at the desired temperature for cooking.

The screw 29 in the cooking tube 11 does not feed the food through the cooking tube and does not exert any mechanical pressure upon the food which might be likely to bruise or otherwise mangle it. Instead, the food in the cooking tube 11 tends to float in the hot water therein and is actually propelled slightly against the back of the rotary screw 29 due to the action of the nozzles 62 and due to the fact that the hot water is flowing at a faster rate from the tube 10 due to the greater speed of the screw 23 therein. Actually, the screw 29 in the cooking tube 11 retards and controls the passage of the food through the elongated cooking tube and this assures that the food is thoroughly cooked in the desired manner without bruising, mangling and with no possibility of the food becoming scorched or sticking to any parts of the apparatus. The time required for the cooking cycle may obviously be varied over a wide range by substitutions in the gearing elements of the drive gearing shown particularly in FIGURES 2 and 3. Also, as previously noted, the pitch of the helix on one or both of the screws 23 and 29 may be changed when desired. That is to say, the screws 23 and 29 may be removed from the apparatus and substituted for by new screws having a different pitch. In such manner, a particular food product may be cooked in the ideal manner without scorching, damaging in any manner and without sticking.

When the cooked food reaches the discharge end of the tube 11, it passes continuously and directly into the tank 15 and tends to gravitate onto the conveyer belts 63. The upper run of this belt carries the cooked food upwardly within the tank and at the top of the tank the water is drained from the food and falls back into the tank and the food is discharged from the top of the belt into a suitable collection receptacle or bin.

The hot water from the tank 15 recirculates continuously back into the tube 10 by way of the branch tube section 22 as previously explained. The proper water level is continuously maintained through the pipe 74 having valve 75. The system may be drained when required through the pipe 77 having valve 78.

If preferred, the water heating tube 10, cooking tube 11 and branch tubes 12 and 22 may be covered with suitable heat insulating material. The walls of the tank 15 may also be suitably heat insulated, if desired.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. Apparatus for cooking various food products on a commerical scale without scorching, bruising or mangling the food products, said apparatus comprising a companion pair of substantially horizontal elongated tubes arranged side-by-side at substantially the same elevation, a short branch tube connecting corresponding ends of said tubes, a food collection tank communicating with the discharge end of one of said tubes remote from said branch tube, conveyor means associated with said tank to receive and convey away food products introduced into said tank from said discharge end, a second short branch tube interconnecting said tank with the tube remote from the tank and below said discharge end, helical screw elements one each disposed for rotation within said tubes, means to drive said screw elements in unison and in opposite directions to cause water to circulate through said tubes lengthwise in opposite directions and toward said discharge end of said one tube, steam pipe means, and a multiplicity of inclined steam jet nozzles carried by the steam pipe means and connected in said tubes to direct jets of steam into said tubes for heating moving water therein, and means for introducing water into said tubes and tank and maintaining the water level therein near the tops of said helical screw elements.

2. A non-scorching stick-proof continuously flowing hot water cooker for commercial batches of food products comprising an elongated substantially horizontal water heating tube having closed ends, a helical screw element journaled within said tube for rotation and substantially coextensive therewith, a steam header disposed beneath said tube and extending lengthwise thereof, a plurality of upwardly directed inclined steam jet nozzles leading from said header and opening into the bottom of said tube for directing steam jets into said tube in a direction aiding the passage of water through said tube and heating said water to a point near the boiling point of water, an elongated substantially horizontal cooking tube spaced from said water heating tube and substantially parallel and coextensive lengthwise therewith and disposed at the elevation of the water heating tube, a second helical screw element journaled within said cooking tube for rotation and substantially coextensive therewith, a second steam header disposed beneath said cooking tube and extending lengthwise thereof, a plurality of upwardly directed inclined steam jet nozzles leading from the second header and opening through the bottom of the cooking tube for directing steam jets into the cooking tube in a direction aiding the flow of water lengthwise through the cooking tube in one direction and opposite to the direction of flow of the water through the water heating tube, a transverse substantially horizontal branch tube interconnecting corresponding end portions of the water heating and cooking tubes and being of approximately the same diameter as the water heating and cooking tubes, steam pipe means leading to and connected with said headers to supply the latter with live steam, a food collection and discharge tank disposed at the end of the cooking tube remote from said branch tube and communicating with the cooking tube and having a longitudinally inclined bottom wall extending below the outlet of the cooking tube and upstanding side walls and being open at its top, an inclined endless foraminous conveyer belt disposed within said tank substantially parallel to the bottom wall thereof and having a lower end disposed below the outlet of the cooking tube and an upper end disposed near the top of the tank and adapted to receive the cooked food from the cooking tube for conveying the same upwardly within said tank and draining the water therefrom and discharging the cooked food outside of the tank, means to drive said conveyer belt, a second substantially horizontal transverse branch tube interconnecting said tank with the water heating tube near the bottom of the tank and beneath the outlet of the cooking tube and near the bottom of the water heating tube and near the end thereof remote from the first-named branch tube, water inlet means connected with the second-named branch tube for supplying water thereto and maintaining said tubes and tank filled with water to approximately the level of the tops of said screw elements, a food hopper carried by said cooking tube near its end remote from said tank and being upstanding so that food placed therein will gravitate into the cooking tube, and power operated means connected with said helical screw elements for turning the same in unison and in the proper direction to continuously advance water through the water heating, cooking and branch tubes toward said tank and for turning the screw element of the water heating tube substantially faster than the screw element of the cooking tube so that the food in the cooking tube is propelled at all times by the water in the cooking tube and not by the screw element thereof.

3. A commercial food cooker of a type wherein the food to be cooked is immersed in a circulating stream of hot water and said stream flows in a controlled manner at a predetermined rate to provide controlled cooking without scorching or otherwise damaging the food, said cooker comprising a pair of elongated substantially horizontal tubes arranged in side-by-side substantially parallel spaced relation at the same elevation, short transverse tubes interconnecting corresponding ends of said tubes so that water may circulate continuously therethrough lengthwise thereof in opposite directions, helical screw elements journaled within said tubes for rotation and adapted to control the passage of the water through the tubes in a controlled manner, power operated gearing means connected with the screw elements to operate the same in unison and to cause the screw element of one tube to turn faster than the screw element of the other tube, means to introduce a plurality of steam jets into said tubes at spaced points along their lengths and in a direction to aid the passage of water therethrough and adapted to heat said water, means for maintaining the water level in said tubes near the tops of said screw elements, a collection tank communicating with one end of one of said tubes and communicating with one of said transverse tubes, an inclined conveyer belt within said tank for conveying cooked food from said one tube outside of said tank, means to drive said conveyer belt, and hopper means for introducing uncooked food into said one tube near its end remote from said tank.

4. Cooking apparatus comprising an elongated substantially horizontal cylindrical water heating tube having closed ends, an elongated substantially horizontal cylindrical cooking tube disposed in spaced side-by-side substantially parallel relation to said heating tube at the elevation of the heating tube and having one closed end and an open discharge end, a tank communicating with said open discharge end of the cooking tube and underlying such end and having an inclined bottom, a first branch tube interconnecting said water heating and cooking tubes near the closed end of the cooking tube, a second branch tube interconnecting the other end of the water heating tube with the bottom of said tank and below the open discharge end of the cooking tube, an inclined perforated conveyer belt within said tank underlying the open discharge end of the cooking tube and extending near the top of the tank for conveying cooked food from the cooking tube outside of the tank, means for introducing jets of live steam into said water heating and cooking tubes in a direction aiding the passage of water therethrough longitudinally toward said tank, said steam jets heating said water in said tubes, food hopper means mounted upon said cooking tube near its end remote from said tank and communicating with the interior of the cooking tube, helical screw elements mounted within said water heating and cooking tubes and extending throughout the major portions of the lengths thereof and operable to advance the water through said tubes in a controlled manner and to regulate the passage of the food in said water through said cooking tube toward said tank, a drive motor, and gearing interconnecting the drive motor with said screw elements to turn the same in unison in the proper direction for advancing the water through said tubes toward said tank, and for driving the screw element of the water heating tube substantially faster than the screw element of the cooking tube.

5. Apparatus for cooking comprising a companion pair of spaced substantially horizontal substantially parallel tubes of considerable length and of relatively small diameter compared to their overall lengths, a branch transverse tube interconnecting said pair of tubes near corresponding ends thereof, a tank communicating with the opposite end of one of said tubes, a second transverse branch tube interconnecting said tank and the adjacent end of the other tube of said pair near the bottom of the tank, foraminous conveyer means in said tank extending below said tube communicating with said tank for receiving cooked food therefrom and conveying it upwardly, hopper means carried by the last-named tube near its end remote from the tank, means for introducing steam into the tubes of said pair, helical screw elements disposed rotatably within the tubes of said pair, and means to rotate said elements in unison.

6. Cooking apparatus comprising an elongated substantially horizontal water heating tube having closed ends, an elongated substantially horizontal cooking tube spaced laterally of the water heating tube at the elevation thereof and substantially coextensive therewith lengthwise and having a closed end and an open discharge end, a tank connected with the open discharge end of the cooking tube and receiving cooked food therefrom, a discharge conveyer for the cooked food within said tank and underlying said discharge end of the cooking tube, a first branch tube interconnecting the water heating and cooking tubes near their ends remote from the tank, a second branch tube interconnecting said tank and the adjacent end of the water heating tube near the bottom of the tank, means for maintaining said tubes, first-named branch tube and tank filled with water to a level near the tops of the water heating and cooking tubes, means for introducing steam into the water heating and cooking tubes at a plurality of points along their lengths, helical screw elements disposed rotatably within the water heating and cooking tubes, and means to rotate said screw elements.

7. Cooking apparatus according to claim 6, and wherein the last-named means includes gearing adapted to drive the screw element of the water heating tube at a rate faster than the screw element of the cooking tube.

8. Cooking apparatus according to claim 6, and wherein said discharge conveyer is an inclined foraminous endless conveyer belt, and means to drive said belt independently of said screw elements.

9. Cooking apparatus according to claim 6, and wherein said steam introducing means includes a steam header underlying the water heating and cooking tubes, and a plurality of inclined steam jet nozzles interconnecting the headers and said water heating and cooking tubes.

References Cited in the file of this patent

UNITED STATES PATENTS

| | | |
|---|---|---|
| 1,922,035 | Goodman | Aug. 15, 1933 |
| 2,200,192 | Sipe | May 7, 1940 |
| 2,480,146 | Lee | Aug. 30, 1949 |
| 2,571,555 | Fernandes | Oct. 16, 1951 |
| 2,572,192 | Peters | Oct. 23, 1951 |